United States Patent
Polyudov

(10) Patent No.: US 7,363,434 B2
(45) Date of Patent: Apr. 22, 2008

(54) METHOD, SYSTEM, AND COMPUTER-READABLE MEDIUM FOR UPDATING MEMORY DEVICES IN A MULTI-PROCESSOR COMPUTER SYSTEM

(75) Inventor: Feliks Polyudov, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 529 days.

(21) Appl. No.: 10/391,719

(22) Filed: Mar. 18, 2003

(65) Prior Publication Data

US 2004/0186988 A1 Sep. 23, 2004

(51) Int. Cl.
*G06F 12/14* (2006.01)
*G06F 11/14* (2006.01)
*G06F 11/16* (2006.01)

(52) U.S. Cl. ............................. 711/147; 714/2; 714/25
(58) Field of Classification Search ..................... None
See application file for complete search history.

(56) References Cited

U.S. PATENT DOCUMENTS

| | | | | |
|---|---|---|---|---|
| 6,477,482 | B1 * | 11/2002 | Maupin et al. ............. | 702/183 |
| 6,920,581 | B2 * | 7/2005 | Bigbee et al. ................ | 714/10 |
| 7,000,101 | B2 * | 2/2006 | Wu et al. ....................... | 713/1 |
| 2002/0169899 | A1 * | 11/2002 | Oshins et al. .................. | 710/8 |
| 2003/0009654 | A1 * | 1/2003 | Nalawadi et al. .............. | 713/1 |
| 2003/0135785 | A1 * | 7/2003 | Carr ............................ | 714/25 |
| 2003/0163753 | A1 * | 8/2003 | Lu et al. ........................ | 714/2 |

OTHER PUBLICATIONS

Advanced Configuration and Power Specification, p. 115 revision 2.0 Jul. 27, 2000.*

* cited by examiner

*Primary Examiner*—Gary Portka
*Assistant Examiner*—Duc T. Doan
(74) *Attorney, Agent, or Firm*—Hope Baldauff Hartman LLC

(57) ABSTRACT

A method, system and computer-readable medium are provided for updating memory devices in a multi-processor computer system. A computer program is launched on a first processor in the multi-processor computer system. The program contains update code for updating memory devices in the computer system. Each processor in the computer system is associated with a memory device. Processors only have access to the memory devices with which they are associated. The program launched on the first processor determines the identity of additional processors associated with memory devices inaccessible by the first processor. The first processor then sends the code contained in the program to the identified additional processors. Finally, the update code is executed on the first processor and the identified additional processors to update the memory devices associated with each processor in the multi-processor computer system. The memory devices may be flash memory devices for storing a BIOS for the multi-processor computer system.

20 Claims, 4 Drawing Sheets

| Flash Memory | Starting Address | Size |
|---|---|---|
| North | ffe00000 | 2 MB | ~ 405
| South | ff400000 | 4 MB | ~ 410

| Processor LID | ID | EID (Node) |
|---|---|---|
| 218 (4B) | 2 | 18 | ~ 505
| 318 (4C) | 3 | 18 | ~ 510
| 418 (4D) | 4 | 18 | ~ 515
| 120 (6A) | 1 | 20 | ~ 520
| 220 (6B) | 2 | 20 | ~ 525
| 320 (6C) | 3 | 20 | ~ 530
| 420 (6D) | 4 | 20 | ~ 535

| Processor | LID (Node) |
|---|---|
| 4A | 118 | ~ 605
| 6A | 120 | ~ 610

METHOD, SYSTEM, AND COMPUTER-READABLE MEDIUM FOR UPDATING MEMORY DEVICES IN A MULTI-PROCESSOR COMPUTER SYSTEM

TECHNICAL FIELD

The present invention is related to computer system configuration. More particularly, the present invention is related to updating the contents of memory devices in multi-processor computer systems.

BACKGROUND OF THE INVENTION

Some computer systems have a firmware basic input/output system ("BIOS") containing basic routines which are accessed to boot the computer as well as to initialize and interface hardware with operating system software. Occasionally, the BIOS may need to be updated to reflect changes in the hardware configuration of the computer system or to add new features. To facilitate BIOS updates, the BIOS of many modern computer systems is stored in a type of re-programmable memory, called "flash memory." In large-scale computing or server platforms, the BIOS may be stored on multiple flash memory chips, also called "flash" devices or parts. In computer systems utilizing flash memory to store the BIOS, a software update utility may be used to update the contents of the flash memory by erasing and re-programming each flash device.

Large-scale computing or server platforms utilize multiple central processing units ("CPUs") or processors. In one multi-processor architecture, each group of processors communicates with a hardware interface known as a "node" which provides access to flash memory devices associated with that particular node. Processors in a particular node, however, do not have access to the flash memory devices associated with other nodes. As a result, the update of flash memory devices in these large-scale computing or server platforms is made more difficult by requiring a user to manually launch multiple copies of an update utility on each node.

It is with respect to these considerations and others that the present invention has been made.

SUMMARY OF THE INVENTION

In accordance with the present invention, the above and other problems are solved by methods for updating flash memory devices in a multi-processor computer system. These methods utilize a software utility program launched on a processor in a single node of the computer system to update a flash memory device associated with each processor.

In accordance with other aspects, the present invention relates to a method for updating memory devices in a multi-processor computer system. According to the method, a computer program is launched on a first processor in the multi-processor computer system. The program contains update code for updating memory devices in the computer system. Each processor in the computer system is associated with a memory device. Processors only have access to the memory devices with which they are associated. The program launched on the first processor determines the identity of additional processors associated with memory devices inaccessible by the first processor. The first processor then sends instructions for executing the code contained in the program to the identified additional processors. Finally, the update code is executed on the first processor and the identified additional processors to update the memory devices associated with each processor in the multi-processor computer system.

The additional processors may be identified by retrieving an identification of the first processor in the multi-processor system, detecting configuration data stored by a BIOS in the multi-processor system, parsing the configuration data for the identification of each processor other than the first processor, comparing the retrieved identification of the first processor with the identification of each processor parsed from the configuration data, and identifying any processor having an identification unique from the first processor as an additional processor. The configuration data may be contained in Advanced Configuration and Power Interface ("ACPI") tables stored in a shared memory location in the multi-processor system.

The first processor sends instructions for executing the code contained in the program to the identified additional processors by registering the code in a shared memory location and sending the memory location to the identified additional processors.

The first processor may be a processor for booting the multi-processor computer system. Each memory device may store a portion of a BIOS code for the multi-processor computer system. Each memory device may be a flash memory device. The processors and memory devices in the multi-processor computer system may be incorporated into nodes. Each node includes at least one memory device inaccessible by processors in the other nodes of the computer system. The multi-processor computer system may also contain additional memory devices associated with an input/output device. Each memory device associated with the input/output device may be accessed by any of the processors in the multi-processor computer system.

In accordance with other aspects, the present invention relates to a system for updating memory devices in a multi-processor computer system. The system includes a memory for storing a program containing code for updating the memory devices in the multi-processor computer system, a first processor, functionally coupled to the memory and associated with one of the memory devices, a second processor, functionally coupled to the memory and associated with one of the memory devices, determine the identity of the second processor associated with the memory device inaccessible by the first processor, and execute the code contained in the program to update the memory device associated with the first processor. The memory device associated with the second processor is inaccessible by the first processor in the multi-processor computer system and the first processor is responsive to computer-executable instructions contained in the program. The second processor is operative to receive instructions for executing the code contained in the program from the first processor and to execute the code contained in the program to update the memory device associated with the second processor.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 4 illustrates an array showing the starting address and size of flash memory stored in flash memory devices illustrated in the computer system architecture of FIG. 1 according to one embodiment of the invention.

FIG. 5 illustrates a table showing the identifications of processors in the computer system architecture illustrated in FIG. 1 according to one embodiment of the invention.

FIG. 6 illustrates a processor list of unique processors identified in the operational flow illustrated in FIG. 3 according to one embodiment of the invention.

DETAILED DESCRIPTION OF THE INVENTION

Figure 1:
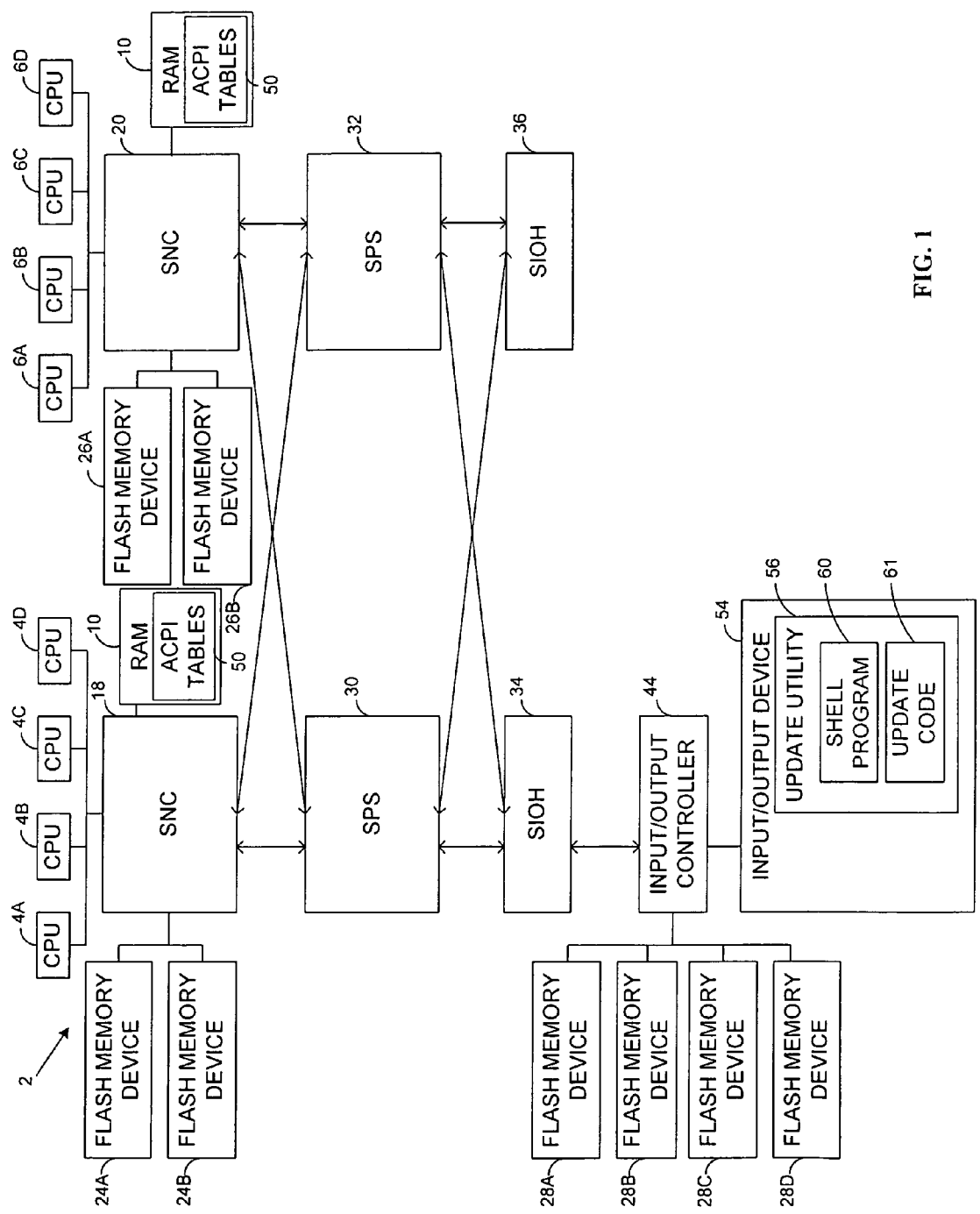
FIG. 1 illustrates a computer system architecture for updating flash memory in a multi-processor computer system utilized in embodiments of the invention.

Embodiments of the present invention provide a method for updating flash memory in a multi-processor computer system. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Referring now to FIG. 1, an illustrative architecture for a computer system 2 for practicing embodiments of the invention will be described. The computer architecture shown in FIG. 1 illustrates a multi-node server configured for use with a multi-processor chipset, such as the Intel® 8870 chipset. The computer system 2 includes eight CPUs (hereinafter referred to as "processors") 4A-4D and 6A-6D. Typically, one of the processors serves as a main or boot processor for starting the computer system while the other processors serve as application processors for running programming applications. In the Intel® 8870 chipset, the processors may be Intel® Itanium 2 processors. The processors 4A-4D and 6A-6D are channeled to two Scalability Node Controllers ("SNCs") (hereinafter referred to as "nodes") 18 and 20. Each node 18 and 20 is linked to random access memory ("RAM") modules 10 which are accessible by all of the processors 4A-4D and 6A-6D.

It should be understood that although the RAM 10 is distributed across the nodes 18 and 20, the memory is logically viewed by all of the processors as a single physical space in the computer system 2. Each node 18 and 20 is also linked to non-volatile RAM ("NVRAM") or flash memory devices (also referred to as "flash parts") 24A-24B and 26A-26B, respectively, storing the BIOS for the computer system 2. As is known to those skilled in the art, flash parts may be utilized to store flash memory, such as the BIOS code for a computer system, as blocks of data. Each block of flash memory has an address indicating its location in the flash memory. In the computer system 2, the flash memory in a set of flash parts linked to a node may be only be accessed by the processors in that node. For example, the processors 4A-4D in the node 18 has access to the flash memory stored in the flash memory devices 24A-24B but does not have access to the flash memory stored in the flash memory devices 26A-26B. Similarly, the processors 6A-6D in the node 20 have access to the flash memory stored in the flash memory devices 26A-26B but do not have access to the flash memory stored in the flash memory devices 24A-24B. As is known to those skilled in the art, the above-described nodes and processors comprise the "North" portion of the chipset.

The computer system 2 also includes a pair of Scalablilty Port Switches ("SPSs") 30 and 32 which link each node 18 and 20 to Server Input/Output Hubs ("SIOHs") 34 and 36. Each SIOH serves as an interface to input/output devices in the computer system. Each SPS routes data traffic between the nodes and the SIOHs. As is known to those skilled in the art, the above-described SPSs and SIOHs, in addition to any interfaced input/output devices, comprise the "South" portion of the chipset. The SPSs 30 and 32 serve to link the processors and memory from the North portion of the chipset to the South portion where input/output devices such as a standard PCI bus bridge, other Industry Standard bridges such as LPC, ISA, or SCSI (not shown), or an input/output controller may be connected to the SIOHs 34 and 36. For example, the processors 6A-6D have access to any input/output devices connected to the SIOH 34 through the SPS 30 or the SPS 32.

The SIOH 34 is connected to an input/output controller 44 for receiving and processing input and output signals from a number of devices, including a keyboard, mouse, display screen, printer, a bootable storage device such as a floppy disk drive or CD-ROM drive (not shown in FIG. 1), or other type of device. In the Intel® 8870 chipset, the input/output controller 44 may be an Intel® 82801 DB I/O Controller Hub 4 ("ICH4"). The input/output controller 44 is linked to NVRAM or flash parts 24C-24F for storing BIOS code in flash memory.

It should be understood that the BIOS for the computer system 2 is split into two parts. One part of the BIOS code is stored as flash memory in the flash memory devices 24A-24B and 26A-26B in the North portion of the chipset while the remainder of the BIOS code is stored as flash memory in the flash memory devices 28A-28D in the South portion of the chipset. As briefly discussed above, the processors 4A-4D and 6A-6D in the North portion of the chipset have access to the SIOH 34 via SPS 30 or 32, and thus have access to the flash memory in the flash memory devices 28A-28D through the input/output controller 44.

The BIOS stored in the flash memory of the computer system 2 also includes Advanced Configuration and Power Interface ("ACPI") tables 50. As is known to those skilled in the art, the ACPI specification defines hardware and software interfaces that enable the operating system to enumerate and configure motherboard devices, such as processors, and manage their power. The BIOS describes the computer system's characteristics by placing data, organized into tables, into predefined memory locations in RAM. These tables include root tables, such as the Extended System Description Table ("XSDT") or the Root System Description Table ("RSDT"), which include an array of physical pointers to other tables. Some of the ACPI tables are hard coded into the BIOS while the remaining tables are created by the BIOS during boot of the computer system by polling hardware devices for information about their configuration. For example, the Advanced Programmable Interrupt Controller ("APIC") table in the ACPI 2.0 specification contains information about processors in chipsets having multi-processor environments. The ACPI tables 50 are formatted according to predefined ACPI specifications. Examples of such specifications include ACPI 1.1 and ACPI 2.0 both of which are incorporated herein by reference.

The input/output controller 44 is connected to an input/output device 54. As discussed briefly above, the input/output device 54 may be a bootable storage device for launching application programs, such as the update utility 56, which performs logical operations for updating the flash memory in the computer system 2, and a shell program 60. The update utility 56 includes update code 61 which may be a thread of the update utility 56 for updating the flash memory. The update utility 56 also includes a shell program 60 which may be an application program for providing a user interface for entering commands to start the update code 61. The logical operations performed by the update utility 56 for updating the flash memory will be described in greater detail in the discussion of FIG. 2 below.

Figure 2:
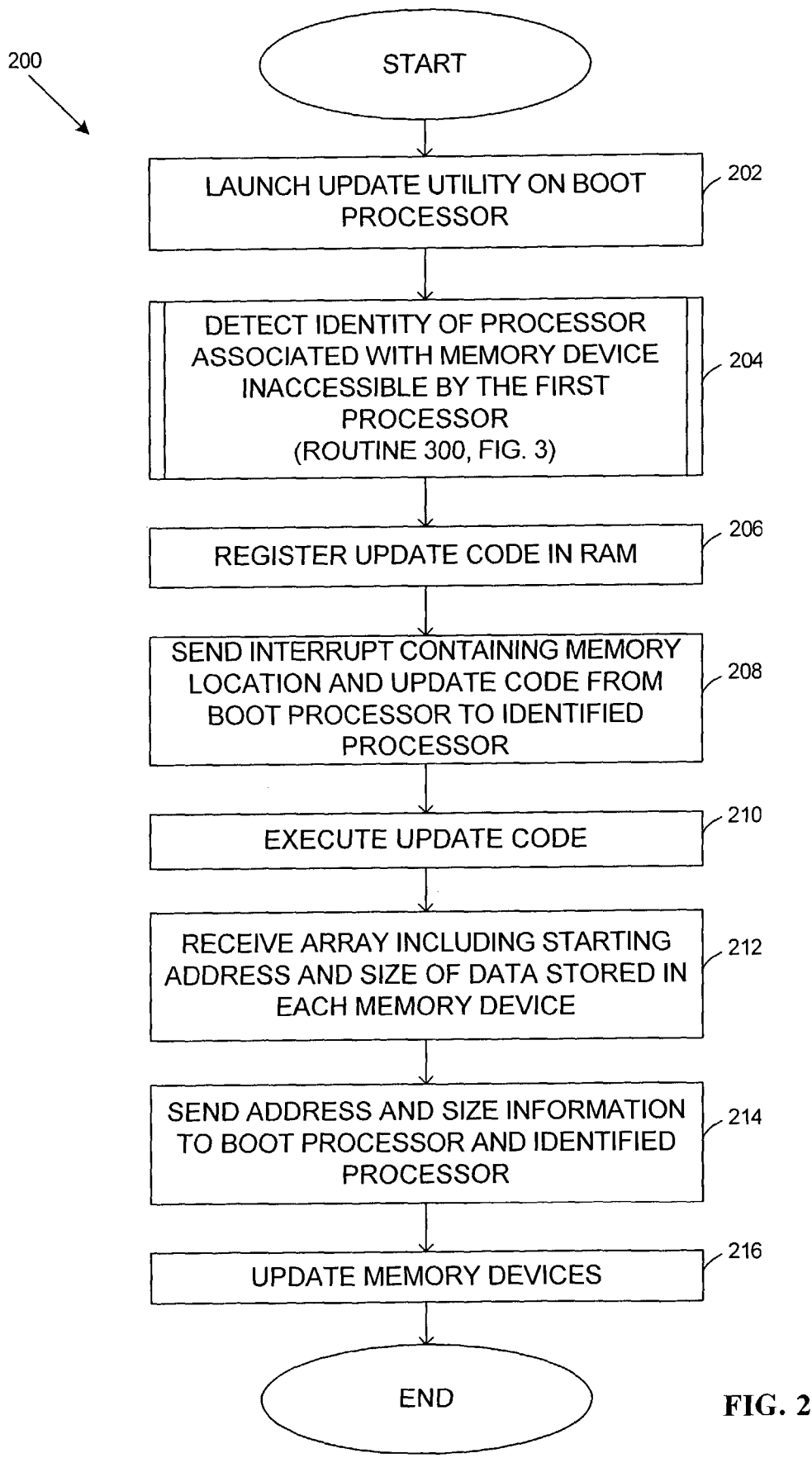
FIG. 2 illustrates an operational flow for updating flash memory in the computer system architecture illustrated in FIG. 1 according to one embodiment of the invention.

FIG. 2 shows illustrative logical operations 200 performed by the update utility 56 for updating the flash memory in the computer system 2 described above. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The logical operations 200 of FIG. 2 begin by launching the update utility 56 in the input/output device 54 on a processor in a node of the computer system at launch operation 202. When the update utility 56 is launched, it is copied to a memory location in the RAM 10. As briefly discussed above, the RAM 10 is accessible by all of the processors in the computer system 2. By way of example, and not limitation, the processor will be designated in the following description as boot processor 4A in the node 18 of the computer system 2. It should be appreciated by those skilled in the art that the processor may be any processor in either node including, but not limited to, the bootstrap processor used to boot a computer system.

After the update utility 56 has been launched on the boot processor 4A, the operational flow continues to detection operation 204. At detection operation 204, the update utility 56 detects the configuration of the computer system 2 to identify an application processor in the node 20 for executing the update code 61 to update the flash memory devices 26A and 26B. It should be understood that any processor in the node 20 may be used to update the flash memory devices 26A and 26B. As briefly discussed above, the boot processor 4A in the node 18 does not have access to the flash memory devices 26A and 26B in the node 20 and thus is unable to directly update these devices. An illustrative operation for detecting the configuration of the computer system 2 to identify the application processors is described in detail below with respect to FIG. 3.

After the detection operation 204 is completed, the operational flow continues to registration operation 206. At registration operation 206, the boot processor 4A registers the update code 61 contained in the update utility 56 to a separate memory location in the RAM 10. After the registration operation 206 is completed, the operation flow continues to interrupt operation 208. At interrupt operation 208, the boot processor 4A communicates the memory location in the RAM 10 for the update code 61 to the application processor in the node 20 previously identified in the detection operation 204. As discussed above, any of the application processors 6A-6D may be utilized to update the flash memory devices 26A and 26B. The inter-processor communication between the boot processor 4A and the identified processor in the node 20 is accomplished through the use of an inter-processor interrupt ("IPI") containing the memory location in the RAM 10 of the update code 61. It should be noted that the communication of IPIs is known to those skilled in the art.

After the interrupt operation 208 is completed, the operational flow continues to execution operation 210. At execution operation 210, the boot processor 4A in the node 18 and the identified processor in the node 20 begin executing the update code 61 to update the flash memory devices 24A-24B and 26A-26B respectively. It should be understood that the boot processor 4A and the identified application processor execute the update code 61 making a call to the memory location in the RAM 10 in which the update code 61 is stored.

Prior to updating the memory devices in the computer system 2, the update code 61 running on the boot processor 4A and the identified application processor retrieves an array of data from the BIOS at operation 212. The array consists of data consisting of the starting address of the first block of flash memory and size of the total flash memory stored in the flash memory devices 24A-24B and 26A-26B associated with the processors in the North portion of the chip set as well as the first block of flash memory and size of the total flash memory stored in the flash memory devices 28A-28D in the South portion of the chipset.

Once the array has been received at operation 212, the update code 61 sends data from the array to the boot processor 4A and the identified application processor at operation 214. The data includes the starting address and size of the flash memory stored in the memory devices associated with each processor. For example, the data sent to the boot processor 4A would consist of the starting address and size of the flash memory stored in flash memory devices 24A-24B, while the array for the identified application processor would consist of the starting address and size of the flash memory stored in flash memory devices 26A-26B in the North portion of the chipset. As briefly discussed above, each processor in the nodes 18 and 20 of the computer system 2 also has access to the flash memory devices 28A-28D in the South portion of the chipset as well. Thus, in addition to sending array data for the flash memory devices associated with each processor, the update code 61 may also send data associated with the flash memory devices 28A-28D in the South portion of the chipset to either the boot processor 4A or the identified application processor.

An example of the array is shown in FIG. 4 for the node 18 in the computer system 2. As shown in FIG. 4, the array 400 includes the starting address of the flash memory for the node 18 as well as the size of the flash memory. In the array 400, the size of each flash memory device 24A and 24B is 1 MB. Thus the size of the array in the North portion of the chipset (as shown on row 405) is 2 MB. The array 400 of FIG. 4 also includes the starting address of the flash memory for the input/output device 54 in the South portion of the chipset on row 410. In the array 400, the size of each flash memory device 28A-28D is 1 MB. Thus the size of the array in the South portion of the chipset is 4 MB.

Returning now to FIG. 2, after the update code has sent the array data to the boot processor 4A and the identified application processor indicating the starting address and size of the flash memory to be updated, the processors execute the update code 61 to update the flash memory at operation 216. The update code 61 executed on the boot processor 4A updates the flash memory devices 24A-24B in the node 18 while the update code 61 executed on the identified application processor (i.e., 6A, 6B, 6C or 6D) in the node 20 updates the flash memory devices 26A-26B, in the North portion of the chipset. As briefly discussed above, the update code 61 executed on either processor may also update the flash memory devices 28A-28D in the input/output device 54 in the South portion of the chipset. One method detailing the execution of the update code 61 to update flash memory devices is presented by Applicants in U.S. patent application Ser. No. 10/391,966 entitled "Method, Apparatus and Computer-Readable Medium for Parallel Updating of Multiple Memory Devices," filed on Mar. 18, 2003, and assigned to the same assignee as this application, which is expressly incorporated herein by reference.

It will be appreciated by those skilled in the art that semaphore logic may be used by the update code 61 for access to shared resources such as the shell program 60 in RAM for generating the user interface for entering commands during the running of the update utility. It should also be noted that the update code 61 is thread safe so that it may run in a multi-processor environment. As is known to those skilled in the art, each processor in the computer system 2 has a separate memory stack space for isolating local data. The update code 61 may utilize the stack space in each processor for storing data while it is executing on a processor.

Figure 3:
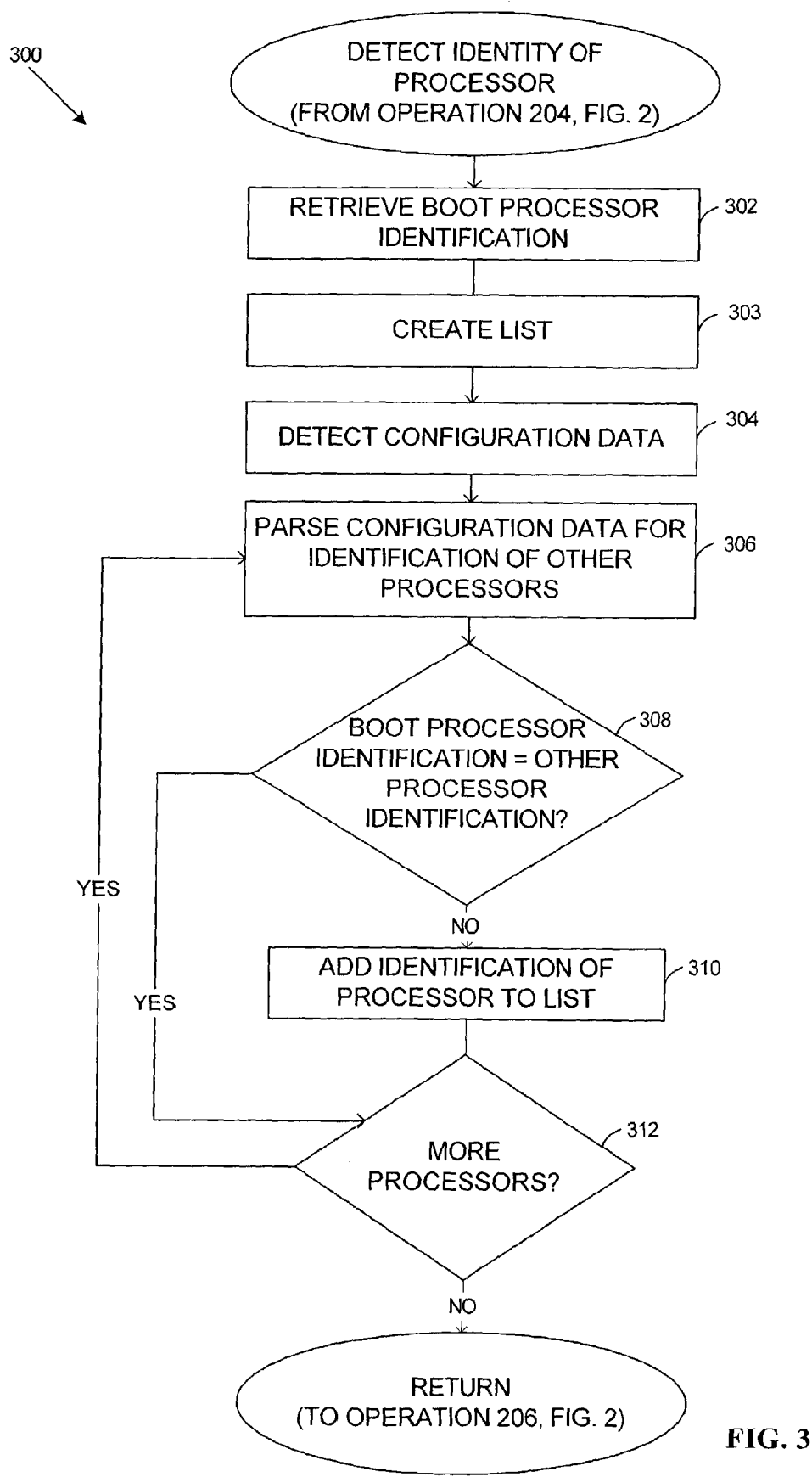
FIG. 3 illustrates an operational flow for identifying processors in the computer system architecture of FIG. 1 for executing code for updating flash memory according to one embodiment of the invention.

FIG. 3 shows illustrative logical operations 300 for detecting the configuration of the computer system 2 for identifying an application processor for executing the update code 61 briefly discussed above in the discussion of the detection operation 204 in FIG. 2. By way of example, and not limitation, the configuration data referred to in the following description may be ACPI tables such as those defined by the ACPI 2.0 specification. It should be appreciated by those skilled in the art however, that tables in other ACPI specifications may also be utilized in implementing the operations described in FIG. 3 without departing from the scope of the invention. It should be further appreciated that other methods, other than the utilization of ACPI tables, may be used for detecting the configuration of the computer system 2 which are known to those skilled in the art.

The logical operations 300 of FIG. 3 begin by the update utility 56 retrieving an identification of the boot processor 4A in the node 18 at retrieval operation 302. In one embodiment, the identification may be the local ID ("LID") which, for the boot processor 4A, is read from a special register inside the boot processor and which, for the application processors, is stored in the ACPI tables which are a part of the BIOS of the computer system 2. As is known to those skilled in the art, each processor in the multi-node computer system 2 has a unique identification which identifies it to the BIOS. The LID typically consists of two fields: an ID and an EID. The ID field of the LID identifies the place of a processor in a node while the EID field identifies the node containing the processor. Thus, processors in different nodes will have the different EIDs. After the identification of the boot processor 4A has been retrieved at retrieval operation 302, the EID of the boot processor may be added to a list created by the update utility 56 for identifying processors in different nodes of the computer system 2 at operation 303. As briefly discussed above, only processors in a particular node may update the flash memory devices in that node.

The operational flow of FIG. 3 continues at detection operation 304 wherein the update utility 56 detects configuration data for the processors in the computer system 2. As briefly discussed above, the configuration data for the processors may consist of ACPI tables such as the ACPI tables 50 in the RAM 10. After the configuration data has been detected at detection operation 304, the operational flow continues at parsing operation 306 where the update utility 56 parses the configuration data for the identification of the application processors (i.e., processors other than the boot processor 4A) in the computer system 2. In the ACPI 2.0 specification, these identifications are stored in the APIC table which is a sub-table of the XSDT. The APIC table contains LIDs of enabled processors in the computer system 2.

As briefly mentioned above, the XSDT table is an ACPI 2.0 compliant root table which includes an array of physical pointers or addresses to other tables. The XSDT table includes the address of the APIC table containing the LIDs of enabled processors in a computer system. After the update utility 56 has collected the identification of an application processor in the computer system 2, the operational flow continues at query operation 308 wherein the update utility 56 compares the EID of the boot processor 4A with the identification retrieved for each additional or application processor in the computer system 2 to determine a processor belonging to another node. Similarly, the update utility 56 also compares the EIDs of the application processors to determine a processor belonging to another node.

For example, the parsing of the APIC table may result in a table of LIDs being collected for the application processors in the computer system 2 as shown in FIG. 5. The processors associated with each LID are indicated in parentheses. The ID and the EID fields comprising each LID are also shown in adjoining columns. As shown in FIG. 5, the parsing operation 306 has collected the LIDs for the application processors 4B-4D and 6A-6D in the computer system 2. As briefly discussed above, the LID for each processor includes an ID indicating the processor's place in a node and an EID indicating the node containing the processor. For example, as shown in row 505 of FIG. 5 the application processor 4B has an ID=2 and an EID=18 indicating that it is the second processor in the node 18.

Returning now to FIG. 3, if the update utility 56 determines that the EID of an application processor is equal to the EID of the boot processor 4A or equal to the EID of a previously discovered application processor in the table shown in FIG. 5, then the application processor belongs to the same node and the operational flow continues to query operation 312 where the update utility 56 determines if there are additional application processors in the computer system 2. If the update utility 56 determines that there are additional application processors, then the operational flow returns to parsing operation 306 where the update utility 56 parses the configuration data for the identification of another application processor. If at query operation 312, the update utility 56 determines that there are no additional application processors, the operational flow returns to operation 206 discussed above in the description of FIG. 2.

If at query operation 308, the update utility determines that the EID of an application processor is not equal to the EID of the boot processor 4A or equal to the EID of a previously discovered application processor, then the application processor belongs to another node (i.e., the node 20) in the computer system 2 and the operational flow continues to operation 310 where the update utility 56 adds the LID of the application processor to the processor list created at operation 303. For example, in the illustrative LID table 500 shown in FIG. 5, the LIDs of the application processors 4B-4D indicate that they belong to the node 18 (i.e., the EID field=18) while the LID of the application processor 6A indicates that it belongs to the node 20 (i.e., the EID field=20). In this example, the LID for the application processor 6A would be added to the list 600 as shown in FIG. 6.

The operational flow then continues from operation 312 where the update utility 56 determines if there are any more application processors in the computer system 2. If there are more application processors, the operational flow returns to parsing operation 306 to collect the identification of the next processor. If there are no more application processors, then the operational flow returns to operation 206 discussed above in the description of FIG. 2.

It should be noted, as briefly discussed above, that the illustrative operations and tables described above in FIGS. 4-6 may be carried out utilizing ACPI tables under the ACPI 1.0 specification by those skilled in the art. For example, in the ACPI 1.0 specification, the RSDT may be parsed for the SPIC table which contains the LIDs of enabled processors in the computer system.

Although the invention has been described in language specific to computer structural features, methodological acts and by computer readable media, it is to be understood that the invention defined in the appended claims is not necessarily limited to the specific structures, acts or media described. For example, the invention is not limited to multi-node computer systems but may also be implemented in any multi-processor computer system. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for updating a plurality of flash memory devices in a multi-processor computer system having multiple physical processors, the method comprising:
    launching a update utility on a boot processor associated with a flash memory device located in a north portion of a chipset of the multi-processor computer system, wherein the update utility includes update code for updating a plurality of flash memory devices in the multi-processor system;
    determining, by way of the boot processor, the identity of at least one application processor associated with a flash memory device located in the north portion of the chipset that is inaccessible by the boot processor in the multi-processor computer system;
    sending, by way of the boot processor, instructions for executing the update code contained in the update utility to the application processor in the multi-processor computer system; and
    concurrently updating the flash memory device associated with the boot processor and the flash memory device associated with the application processor by executing the update code on the boot processor to update a portion of the flash memory device associated with the boot processor while simultaneously executing the update code on the application processor to update a portion of the flash memory device associated with the application processor, whereby the portion of the flash memory device associated with the boot processor is over-written at the same time as the portion of the flash memory device associated with the application processor.

2. The method of claim 1, wherein determining, by way of the boot processor, the identity of the at least one application processor associated with a flash memory device inaccessible by the boot processor in the multi-processor computer system, comprises:
    retrieving an identification of the boot processor in the multi-processor system;
    detecting configuration data stored by a basic input/output system (BIOS) in the multi-processor computer system, wherein the configuration data includes the identification of each processor in the multi-processor system;
    parsing the configuration data for the identification of each processor in the multi-processor system other than the boot processor;
    comparing the identification of the boot processor with the identification of each processor parsed from the configuration data in the multi-processor system; and
    identifying any of the processors having identifications not equal to the identification of the boot processor as the at least one application processor associated with a flash memory device inaccessible by the boot processor.

3. The method of claim 2, wherein sending, by way of the boot processor, instructions for executing the update code contained in the program to the at least one application processor in the multi-processor computer system, comprises:
    registering the update code in a shared memory location of the multi-processor computer system; and
    sending an inter-processor interrupt containing the shared memory location of the update code from the boot processor to the at least one application processor in the multi-processor computer system.

4. The method of claim 3, wherein executing on the boot processor and the at least one application processor, update code for updating the flash memory device associated with each processor in the multi-processor computer system, comprises:
    receiving an array from a shared memory location in the multi-processor computer system, the array including the starting address and size of data stored in each flash memory device;
    sending the starting address and size of the data in each memory device to the boot processor and the at least one application processor; and
    simultaneously executing on the boot processor and the at least one application processor, update code for updating the data stored in each flash memory device.

5. The method of claim 4, wherein the configuration data is contained in one or more advanced configuration and power interface (ACPI) tables stored in a shared memory location in the multi-processor computer system.

6. The method of claim 5, wherein parsing the configuration data for the identification of each processor in the multi-processor system other than the boot processor comprises:
parsing an extended system description table (XSDT) table in the ACPI tables to find an address of an advanced programmable interrupt controller (APIC) table; and
parsing the APIC table for the identification of each processor in the multi-processor system other than the boot processor.

7. The method of claim 6, wherein each memory device stores only a portion of the BIOS for the multi-processor computer system.

8. The method of claim 6, wherein the multi-processor computer system comprises a plurality of nodes, wherein each node includes at least one processor associated with a flash memory device inaccessible by the processors in the other nodes of the computer system.

9. The method of claim 6, further comprising, executing the update code on the boot processor to update a flash memory device located in a south portion of a chipset of the multi-processor computer system and connected to an input/output controller in the multi-processor computer system, wherein the flash memory device connected to the input/output controller is accessible by the boot processor.

10. The method of claim 6, further comprising, executing the update code on the at least one application processor to update a flash memory device located in a south portion of a chipset of the multi-processor computer system and connected to an input/output controller in the multi-processor computer system, wherein the flash memory device connected to the input/output controller is accessible by the at least one application processor.

11. A computer-readable storage medium having computer-executable instructions for performing the method of claim 1.

12. A computer system for updating a plurality of flash memory devices in a multi-processor computer system having multiple physical processors, comprising:
a memory for storing a program containing update code for updating a plurality of flash memory devices in the multi-processor computer system;
a boot processor, functionally coupled to the memory and associated with one of the plurality of flash memory devices located in a north portion of a chipset of the multi-processor computer system;
an application processor, functionally coupled to the memory and associated with one of the plurality of flash memory devices located in the north portion of the chipset of the multi-processor computer system, wherein the flash memory device associated with the application processor is inaccessible by the boot processor in the multi-processor computer system;
wherein the boot processor is responsive to computer-executable instructions contained in the program, and the boot processor determines the identity of the application processor associated with the flash memory device inaccessible by the boot processor and updates the flash memory device associated with the boot processor by executing the update code contained in the program to update the flash memory device associated with the boot processor; and
wherein the application processor receives, by way of the boot processor, instructions for executing update code contained in the program, and concurrently updates the flash memory device associated with the application processor while the boot processor updates the flash memory device associated with the boot processor by executing update code contained in the program to update a portion of the flash memory device associated with the application processor while the boot processor is also executing update code to update a portion of the flash memory device associated with the boot processor, whereby the boot processor over-writes the portion of the flash memory device associated with the boot processor concurrently with the application processor over-writing the portion of the flash memory device associated with the application processor.

13. The system of claim 12, wherein the boot processor is operative to determine the identity of the application processor associated with the flash memory device inaccessible by the boot processor, by:
retrieving an identification of the boot processor;
detecting configuration data stored by a basic input/output system (BIOS) in the multi-processor computer system, wherein the configuration data includes the identification of a plurality of processors in the multi-processor system;
parsing the configuration data for the identification of each of the plurality of processors in the multi-processor system other than the boot processor;
comparing the identification of the boot processor with the identification of each the plurality of processors parsed from the configuration data in the multi-processor system; and
identifying as the application processor a processor in the plurality of processors having an identification not equal to the identification of the boot processor.

14. The system of claim 13, wherein the application processor receives, by way of the boot processor, the update code contained in the program, by receiving an inter-processor interrupt containing a shared memory location of the update code from the boot processor in the multi-processor computer system and executes the update code from the shared memory location.

15. The system of claim 14, wherein the configuration data is contained in one or more advanced configuration and power interface (ACPI) tables stored in a shared memory location in the multi-processor computer system.

16. The system of claim 15, wherein parsing the configuration data for the identification of each the plurality of processors in the multi-processor system other than the boot processor comprises:
parsing an extended system description table (XSDT) in the ACPI tables to find an address of an advanced programmable interrupt controller (APIC) table; and
parsing the APIC table for the identification of each processor in the multi-processor system other than the boot processor.

17. The system of claim 16, wherein each flash memory device stores only a portion of the BIOS for the multi-processor computer system.

18. The system of claim 16, wherein the multi-processor computer system comprises a plurality of nodes, wherein each node includes at least one processor associated with a memory device inaccessible by the processors in the other nodes of the computer system.

19. The system of claim 16, wherein the boot processor is further operative to execute the update code on the boot processor to update a flash memory device located in a south portion of a chipset of the multi-processor computer system and connected to an input/output controller in the multi-processor computer system, wherein the flash memory device connected to the input/output controller is accessible by the boot processor.

20. The system of claim 16, wherein the application processor is further operative to execute the update code on the processor to update a flash memory device located in a south portion of a chipset of the multi-processor computer system and connected to an input/output controller in the multi-processor computer system, wherein the flash memory device connected to the input/output controller is accessible by the application processor.

* * * * *